(12) United States Patent
Shao et al.

(10) Patent No.: US 11,956,128 B2
(45) Date of Patent: Apr. 9, 2024

(54) TEST METHOD AND DEVICE FOR SIMULATING CUSTOMER SERIES DEPLOYMENT ENVIRONMENT

(71) Applicant: DBAPPSECURITY CO., LTD, Hangzhou (CN)

(72) Inventors: Wanyan Shao, Hangzhou (CN); Yuan Fan, Hangzhou (CN); Bo Liu, Hangzhou (CN)

(73) Assignee: DBAPPSECURITY CO., LTD, Hangzhou (CN)

( * ) Notice: Subject to any disclaimer, the term of this patent is extended or adjusted under 35 U.S.C. 154(b) by 0 days.

(21) Appl. No.: 18/025,874

(22) PCT Filed: Apr. 28, 2021

(86) PCT No.: PCT/CN2021/090407
§ 371 (c)(1),
(2) Date: Mar. 10, 2023

(87) PCT Pub. No.: WO2022/057265
PCT Pub. Date: Mar. 24, 2022

(65) Prior Publication Data
US 2023/0353459 A1 Nov. 2, 2023

(30) Foreign Application Priority Data
Sep. 16, 2020 (CN) .......................... 202010972362.2

(51) Int. Cl.
*H04L 41/14* (2022.01)
*H04L 67/1095* (2022.01)

(52) U.S. Cl.
CPC ........ *H04L 41/145* (2013.01); *H04L 67/1095* (2013.01)

(58) Field of Classification Search
CPC .......................... H04L 41/145; H04L 67/1095
See application file for complete search history.

(56) References Cited

U.S. PATENT DOCUMENTS

| | | |
|---|---|---|
| 2005/0286439 A1 | 12/2005 | Capelle et al. |
| 2013/0064125 A1 | 3/2013 | Gintis et al. |

(Continued)

FOREIGN PATENT DOCUMENTS

| | | |
|---|---|---|
| CN | 101001183 A | 7/2007 |
| CN | 107896160 A | 4/2018 |

(Continued)

OTHER PUBLICATIONS

Javawebsoa. "The TCP Three-way Handshake(connect)/four waves (Closed)". 2013. (Year: 2013).*

(Continued)

*Primary Examiner* — Bryan Y Lee (57) ABSTRACT

A test method and device for simulating a customer series deployment environment, an electronic device, and a storage medium are provided. The test method for simulating a customer series deployment environment includes: obtaining traffic data of an on-site protected host; obtaining session data between the on-site protected host and a server on the basis of the traffic data, and extracting application layer data from the session data; and transmitting and receiving the application layer data in a local test environment to carry out simulation test.

13 Claims, 5 Drawing Sheets

(56) References Cited

U.S. PATENT DOCUMENTS

2019/0141061 A1* 5/2019 Krishtal ................ H04L 63/101
2020/0050537 A1* 2/2020 Schmalz, Jr. ....... G06F 11/3672

FOREIGN PATENT DOCUMENTS

| CN | 109560990 A | 4/2019 |
| CN | 112165408 A | 1/2021 |
| IN | 106470136 A | 3/2017 |

OTHER PUBLICATIONS

International Search Report of PCT/CN2021/090407.
China Office Action of 202010972362.2.

* cited by examiner

TEST METHOD AND DEVICE FOR SIMULATING CUSTOMER SERIES DEPLOYMENT ENVIRONMENT

CROSS-REFERENCE TO RELATED APPLICATIONS

This application is a U.S. national phase application under 35 U.S.C. § 371 base upon international patent application No. PCT/CN2021/090407, filed on Apr. 28, 2021, titled "TEST METHOD AND DEVICE FOR SIMULATING CUSTOMER SERIES DEPLOYMENT ENVIRONMENT", which itself claims all benefits accruing from China Patent Application No. 202010972362.2, filed on Sep. 16, 2020, titled "TEST METHOD AND DEVICE FOR SIMULATING CUSTOMER SERIES DEPLOYMENT ENVIRONMENT" in the China National Intellectual Property Administration, both of which are hereby incorporated by reference.

TECHNICAL FIELD

The present disclosure relates to the field of Internet technology, and in particular, to a test method and device for simulating a customer series deployment environment, an electronic device, and a storage medium.

BACKGROUND

Network security testing has always been a concern in information security. Establishing a perfect network security test includes a complete set of processes of research, development, testing and deployment of security functions.

In application, the deployment of a security protection device mainly includes two deployment modes, such as a bypass mode and a series mode. Generally, the bypass mode refers to monitoring via a "port mirroring" function of a network device such as a switch. In this mode, a monitoring device only needs to be connected to a designated mirror port of the switch, so the bypass mode is vividly called "bypass monitoring". The series mode generally refers to monitoring via a gateway or a bridge, since the monitoring device is connected in series as the gateway or the bridge in a network, the series mode is called "series monitoring mode". In the series mode, it is difficult to fully simulate the same test environment due to a variety of environments of a customer site. Thus, when testing the environment of the customer site, if the testing is incomplete, environment applicability of the security protection device is poor, resulting in poor operation stability.

For the issue of poor environment applicability of the network security testing, no effective solution has been proposed.

SUMMARY

The present disclosure provides a test method and device for simulating a customer series deployment environment, an electronic device, and a storage medium, which can solve a problem of poor environment applicability of a network security testing in the related art.

In a first aspect, the present disclosure provides a test method for simulating a customer series deployment environment, including: obtaining traffic data of an on-site protected host; obtaining session data between the on-site protected host and a server on the basis of the traffic data, and extracting application layer data from the session data; and transmitting and receiving the application layer data in a local test environment to carry out a simulation test.

In some embodiments, the obtaining traffic data of the on-site protected host further includes: configuring an IP (Internet Protocol) address and a port of the protected host to obtain the traffic data of the protected host by means of mirroring.

In some embodiments, the obtaining session data between the on-site protected host and the server on the basis of the traffic data, and extracting application layer data from the session data further includes: filtering the traffic data to obtain session packets between the on-site protected host and the server; determining at least one complete TCP (Transmission Control Protocol) session from the session packets; and extracting the application layer data from the TCP session.

In some embodiments, the at least one complete TCP session includes three handshakes at the beginning of the session and four waves at the end of the session.

In some embodiments, the filtering the traffic data to obtain session packets between the on-site protected host and the server further includes: performing rule filtering on the traffic data by wireshark to obtain session packets between the on-site protected host and the server.

In some embodiments, the extracting the application layer data from the TCP session further includes: searching for a data sender IP, a data sender port, a data receiver IP, and a data receiver port of an application layer at a network layer, according to a communication protocol format between the on-site protected host and the server; obtaining data content of the TCP session at the application layer according to the data sender IP, the data sender port, the data receiver IP, and the data receiver port which have been searched; and marking a distribution sequence of the data content of the TCP session at the application layer to obtain the application layer data.

In some embodiments, the transmitting and receiving the application layer data in the local test environment to carry out the simulation test further includes: distributing the application layer data to a client end and a server end in the local test environment in sequence according to the distribution sequence; distributing the application layer data to the server end for simulation when the data sender port in the local test environment coincides with the port of the protected host; and distributing the application layer data to the client end for simulation when the data receiver port in the local test environment coincides with the port of the protected host.

In a second aspect, the present disclosure further provides a test device for simulating a customer series deployment environment, including an obtaining module, an extracting module, and a simulation test module. The obtaining module is configured for obtaining traffic data of an on-site protected host. The extracting module is configured for obtaining session data between the on-site protected host and a server on the basis of the traffic data, and extracting application layer data from the session data. The simulation test module is configured for transmitting and receiving the application layer data in a local test environment to carry out a simulation test.

In a third aspect, the present disclosure further provides an electronic device, including a processor and a memory that stores a computer program running on the processor. The computer program is executed by the processor to implement the steps of the test method for simulating a customer series deployment environment in the first aspect.

In a fourth aspect, the present disclosure further provides a storage medium having stored a computer program. The computer program is executed by a processor to implement the steps of the test method for simulating a customer series deployment environment in the first aspect.

In contrast to the related art, the present disclosure provides the test method and device for simulating the customer series deployment environment, the electronic device, and the storage medium. The method includes: obtaining traffic data of the on-site protected host; obtaining session data between the on-site protected host and the server on the basis of the traffic data, and extracting application layer data from the session data; and transmitting and receiving the application layer data in the local test environment to carry out the simulation test. The method can solve the problem of poor environment applicability of the network security testing in the related art, and achieve technical effect of rapid deployment of network environments.

The details of one or more embodiments of the present disclosure are set forth in the accompanying drawings and the description below. Other features, objects and advantages of the present disclosure will become apparent from the description and drawings.

BRIEF DESCRIPTION OF THE DRAWINGS

The drawings illustrated herein are used to provide a further understanding of the present disclosure, constituting part of the present disclosure. Illustrative embodiments of the present disclosure and its description used for explain the present disclosure, are not construed as an undue qualification of the present disclosure. In the drawings.

DETAILED DESCRIPTION

In order to make objects, technical solutions and advantages of the present disclosure more clearly understood, the present disclosure is described and illustrated in the following with reference to the accompanying drawings and embodiments. It should be understood that specific embodiments described herein are only used to explain the present disclosure and not intended to limit the present disclosure. All other embodiments obtained by those skilled in the art based on the embodiments of the present disclosure without making creative labor are within the scope of the present disclosure. It is also understood that although the efforts made in such development process may be complex and lengthy, some changes in design, manufacture or production based on the technical content disclosed in the present disclosure are only conventional technical means to those skilled in the art related to the content disclosed in the present disclosure and should not be construed as inadequate for the content disclosed in the present disclosure.

The reference to "embodiment" in the present disclosure means that with reference to the particular features, structures or characteristics described in the embodiments may be included in at least one embodiment of the present disclosure. The phrase "embodiment" appears in various positions in the description does not necessarily refer to the same embodiment, nor is it a separate or embodiment that is mutually exclusive with other embodiments. It can be expressly and implicitly understood by those skilled in the art that the embodiments described in the present disclosure may be combined with other embodiments in the absence of conflict.

Unless otherwise defined, all technical and scientific terms used herein have the same meaning as a skilled person in the art would understand. The term "one", "a", "an", "the" and other similar words as used in the present disclosure do not indicate quantitative limitations, and they can be singular or plural. The terms "include", "comprise", "have", and any variation thereof, as used in the present disclosure, are intended to cover a non-exclusive inclusion. For example, processes, methods, systems, products, or devices including a series of steps or modules (units) are not limited to listed steps or units, but may include steps or units not listed, or may include other steps or units inherent in those processes, methods, products, or devices. The terms "connection", "connected", "coupling", and other similar words as used in the present disclosure are not limited to physical or mechanical connections, but may include electrical connections, which can be direct connections or indirect connections. The term "plurality" in the present disclosure refers to two or more. "And/or" describes an association relationship between associated objects, indicating that there can be three kinds of relationships. For example, "A and/or B" can mean that A exists alone, A and B exist at the same time, and B exists alone. The terms "first", "second", "third", etc. involved in the present disclosure are only configured for distinguishing similar objects, and do not represent a specific order of the objects.

Figure 1:
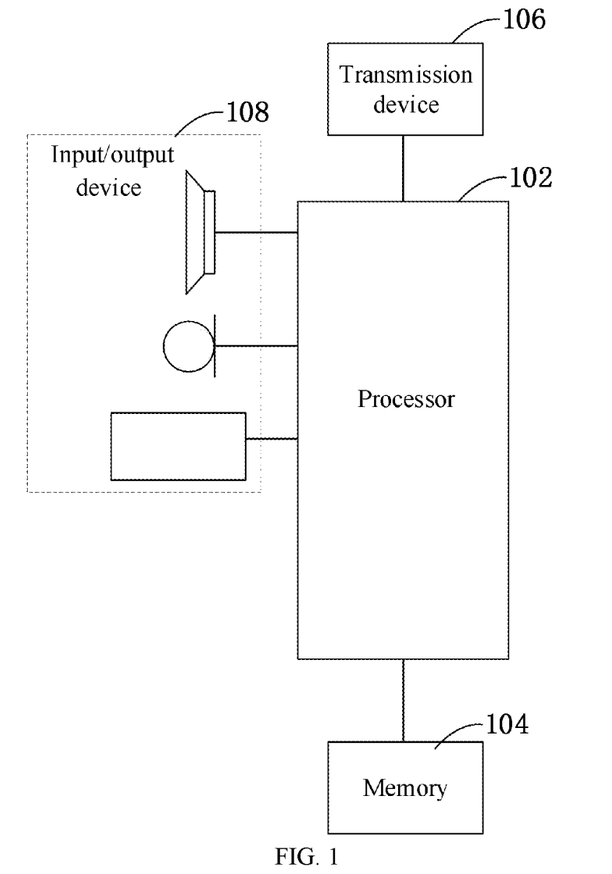
FIG. 1 is a hardware block diagram of an application end of a test method for simulating a customer series deployment environment in an embodiment of the present disclosure.

The method provided by the present embodiment may be executed in terminals, computers or similar arithmetic devices. Running on a terminal is taken as an example. FIG. 1 is a hardware block diagram of an application end of a test method for simulating a customer series deployment environment in an embodiment of the present disclosure. Referring to FIG. 1, the terminal 10 may include one or more (only one is shown in FIG. 1) processors 102 (the processor 102 may include, but not limited to, processing apparatuses such as a Micro Controller Unit (MCU) or a Field Programmable Gate Array (FPGA)) and a memory 104 configured to store data. Alternatively, the terminal 10 may further include a transmission device 106 and an input/output device 108 for communication functions. It should be understood by a person of ordinary skill in the art that the structure shown in FIG. 1 is merely illustrative, and not intended to limit the structure of the terminal. For example, the terminal 10 may further include more or less components than those shown in FIG. 1, or have a configuration different from that shown in FIG. 1.

The memory 104 may be configured to store a computer program, for example, a software program and module of application software, such as a test method for simulating a customer series deployment environment in the embodiment of the present disclosure, and the processor 102 executes various functional applications and data processing by running the computer program stored in the memory 104, that is, implements the above method. The memory 104 may include a high-speed random access memory and may also include a non-volatile memory such as one or more magnetic storage devices, flash memories, or other non-volatile solid state memories. In some embodiments, the memory 104 may further include memories remotely located relative to the processor 102, which may be connected to the terminal via a network. The examples of such networks include, but are not limited to, the Internet, the Intranet, local area networks, mobile communication networks, and combinations thereof.

The transmission device 106 is configured to receive or send data via a network. The above network may specifically include a wireless network provided by a communication provider of the terminal 10. In an embodiment, the transmission device 106 includes a Network Interface Controller (NIC) that may be connected to other network devices via a base station to communicate with the Internet. In an embodiment, the transmission device 106 may be a Radio Frequency (RF) module for communicating with the Internet wirelessly.

Figure 2:
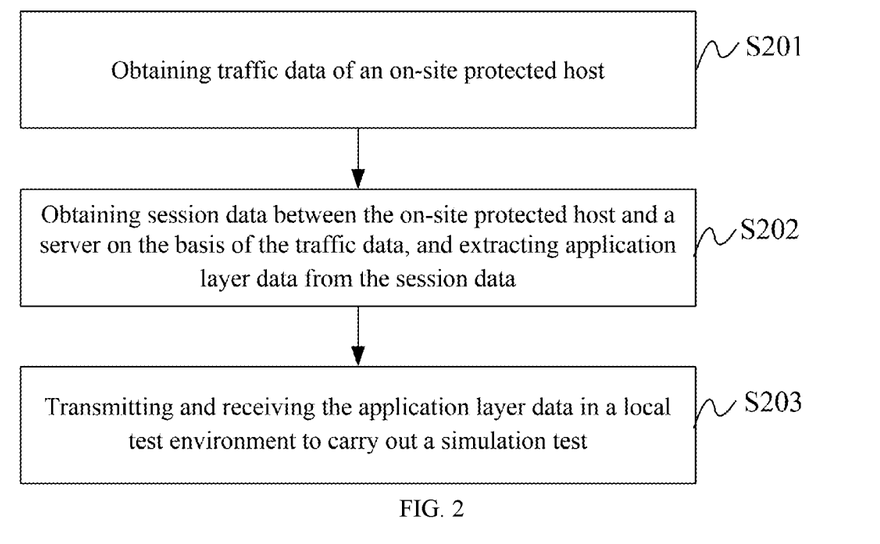
FIG. 2 is a flowchart of a test method for simulating a customer series deployment environment in an embodiment of the present disclosure.

The present embodiment provides a test method for simulating a customer series deployment environment. FIG. 2 is a flowchart of a test method for simulating a customer series deployment environment in an embodiment of the present disclosure. Referring to FIG. 2, the method includes step 201 to step 203.

Step 201 includes obtaining traffic data of an on-site protected host.

The traffic data described above may refer to a plurality of packets transmitted by the on-site protected host to a server, and the traffic data may mainly include two parts of a message part and a data part.

Specifically, a local server can be connected with the on-site protected host to obtain a plurality of packets of the on-site protected host by means of mirroring.

Step 202 includes obtaining session data between the on-site protected host and a server on the basis of the traffic data, and extracting application layer data from the session data.

The session data may refer to TCP session data, and complete TCP session data may include three handshakes at the beginning of the session and four waves at the end of the session.

Specifically, after the packets of the on-site protected host are obtained by means of mirroring, the packets may be parsed to obtain the complete TCP session data, and the complete TCP session data may be further parsed to obtain application layer data in each TCP session.

Step 203 includes transmitting and receiving the application layer data in a local test environment to carry out a simulation test.

The application layer data can include a data sender IP, a data sender port, a data receiver IP, a data receiver port, data content, etc.

Specifically, the step 203 can include establishing the local test environment based on the obtained application layer data, which can include obtaining a complete TCP session, parsing the complete TCP session to obtain a source IP address, a source port, a destination IP address and a destination port, and configuration of the sender and the receiver, and establishing the local test environment based on the obtained configuration. Furthermore, the step 203 can include locally simulating a client end and a server end, sending request data from the client end to the server end to carry out a simulation test, and sending returned data from the server end to the client end to carry out the simulation test.

It should be further noted that for the returned data, the traffic data is actually sent from a database server to the client end. At this moment, a port of the database server is served as the source port.

For the request data, the traffic data is actually sent from the client end to the database server. At this moment, a port of the client end is served as the source port.

In the related art, the deployment of a security protection device mainly includes two deployment modes in environments of a customer site, such as a bypass mode and a series mode. In the series mode, due to a complex environment of a protected site, it is difficult to simulate the test environment of the customer site on the server end. Therefore, when testing the environment of the customer site, if the testing is incomplete, the testing would fail.

The step 201 to step 203 can be provided to quickly simulate an environment of the customer site at the server end and establish the local test at the server end, which can solve the problem of poor environment applicability of the network security testing in the related art, and achieve technical effect of rapid deployment of network environments.

In some embodiments, the obtaining traffic data of the on-site protected host may further includes: configuring an IP address and a port of the protected host to obtain the traffic data of the protected host by means of mirroring.

When obtaining the traffic data by means of mirroring, the traffic data can be directly obtained without need of other network devices, which is easy and fast. In addition, when a problem occurs in the client end that obtains the traffic data, the server end would not be affected.

In some embodiments, the obtaining session data between the on-site protected host and the server on the basis of the traffic data, and extracting application layer data from the session data may further include: filtering the traffic data to obtain session packets between the on-site protected host and the server; determining at least one complete TCP session from the session packets; and extracting the application layer data from the TCP session.

Specifically, a packet in the traffic data may be captured, a complete TCP session may be determined from the packet, and the application layer data may be extracted from the TCP session. The application layer data can include a source IP address, a source port, a destination IP address, a destination port, etc.

In an Open System Interconnection Reference Model (OSI), the TCP session in a transport layer of the OSI is a reliable, connection-oriented sending service, and data is delivered in segments. The sending service is connection-oriented, which means that a TCP session is established before the on-site protected host exchanges data, and the TCP session can be parsed to obtain application layer data. Specific configuration of the client end can be obtained by the content of the application layer data, thus increasing accuracy of simulating a customer site environment.

In some embodiments, the at least one complete TCP session may include three handshakes at the beginning of the session and four waves at the end of the session.

The complete TCP session can be used as a customer site environment, which can deploy the local test environment more efficiently.

In some embodiments, the filtering the traffic data to obtain session packets between the on-site protected host and the server may further include: performing rule filtering on the traffic data by a packet capture tool named wireshark to obtain session packets between the on-site protected host and the server.

Specifically, the packet capture tool named wireshark can be used to capture packets, and the packets can be filtered based on a MAC (Media Access Control) address, an IP address, a source IP address, a destination IP address, a port, and a protocol. By means of filtering, the required session packets can be quickly obtained, and the deployment environment can be determined by the session packets.

Only eligible packets can be captured, and ineligible packets can be filtered out by a winpcap (windows packet capture) of the wireshark, thus improving efficiency for simulating the deployment environment.

In some embodiments, the extracting the application layer data from the TCP session may further include: searching for a data sender IP, a data sender port, a data receiver IP, and a data receiver port of an application layer at a network layer, according to a communication protocol format between the on-site protected host and the server; obtaining data content of the TCP session at the application layer according to the data sender IP, the data sender port, the data receiver IP, and the data receiver port which have been searched; and marking a distribution sequence of the data content of the TCP session at the application layer to obtain the application layer data.

The marking the distribution sequence of the data content of the TCP session at the application layer can include recording a reception order and a sending order of the session data, thus accurately simulating a reception order and a sending order of the customer site, and achieving technical effect of rapid deployment of network environments.

Figure 3:
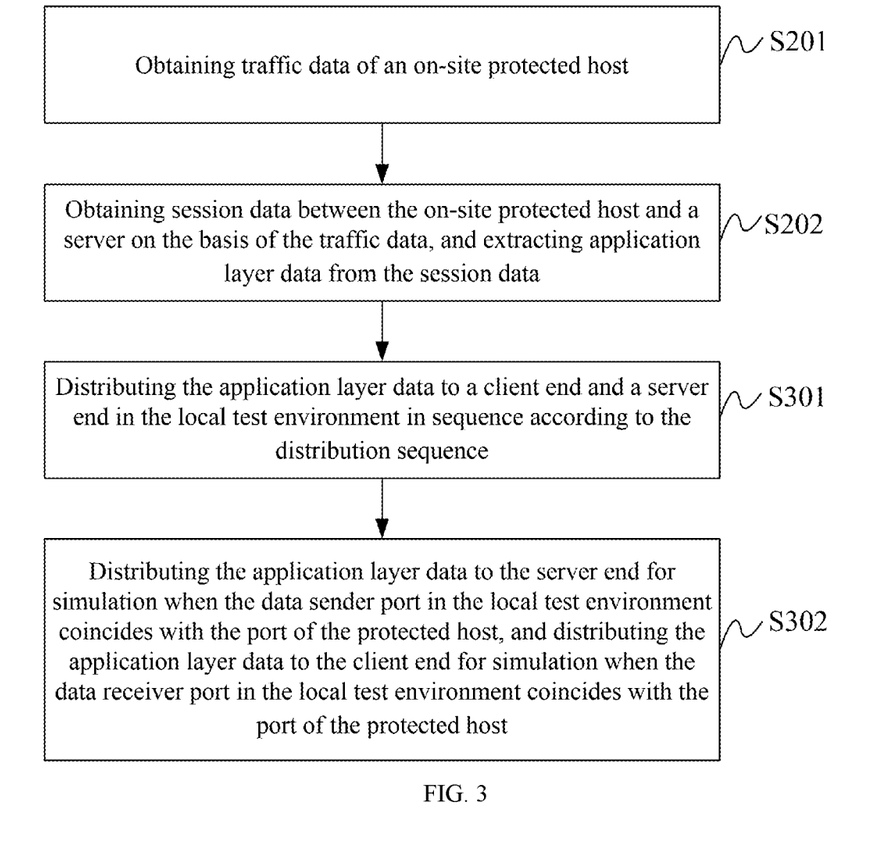
FIG. 3 is a flowchart of a simulation test in a test method for simulating a customer series deployment environment in an embodiment of the present disclosure.

The present embodiment may further provide a simulation test in a test method for simulating a customer series deployment environment. FIG. 3 is a flowchart of a simulation test in a test method for simulating a customer series deployment environment in an embodiment of the present disclosure. Referring to FIG. 3, transmitting and receiving the application layer data in a local test environment to carry out a simulation test may further include step 301 and step 302.

Step 301 may include distributing the application layer data to a client end and a server end in the local test environment in sequence according to the distribution sequence.

Step 302 may include distributing the application layer data to the server end for simulation when the data sender port in the local test environment coincides with the port of the protected host, and distributing the application layer data to the client end for simulation when the data receiver port in the local test environment coincides with the port of the protected host.

It should be noted that it is necessary to determine the type of the application layer data, whether the type belongs to the request data or the returned data. The request data is sent from the client end to the server end, and the returned data is sent from the server end to the client end. During the simulation test, it should be clearly distinguished that whether the application layer data should be sent from the client end or the server end. With the steps described above, the local test environment can be accurately simulated, thus increasing accuracy of simulating the customer series deployment environment.

In the related art, the deployment of a security protection device mainly includes two deployment modes in environments of a customer site, such as a bypass mode and a series mode. In the series mode, due to a complex environment of a protected site, it is difficult to simulate the test environment of the customer site on the server end. Therefore, when testing the environment of the customer site, if the testing is incomplete, the testing would fail.

Figure 4:
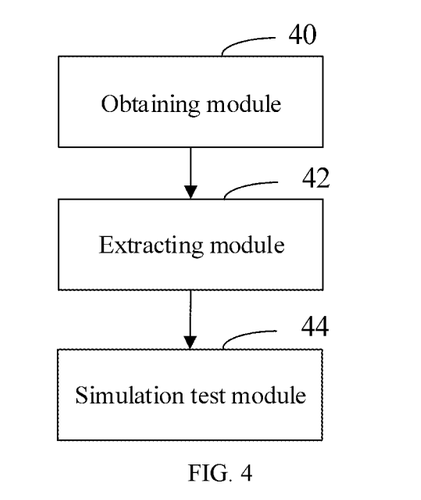
FIG. 4 is a block diagram of a test device for simulating a customer series deployment environment in an embodiment of the present disclosure.

The present embodiment may further provide a test device for simulating a customer series deployment environment. FIG. 4 is a block diagram of a test device for simulating a customer series deployment environment in an embodiment of the present disclosure. The device is configured to implement the above embodiments and alternative embodiments, and details of the above description would not be repeated. As used below, the terms "module", "unit", "subunit" and the like may be a combination of software and/or hardware for implementing a predetermined function. Although the devices described in the following embodiments is preferably implemented in software, implementations in hardware, or a combination of software and hardware are also possible and contemplated.

The test device for simulating the customer series deployment environment includes an obtaining module 40, an extracting module 42, and a simulation test module 44.

The obtaining module 40 is configured for obtaining traffic data of an on-site protected host.

The traffic data described above may refer to a plurality of packets transmitted by the on-site protected host to a server, and the traffic data may mainly include two parts of a message part and a data part.

Specifically, a local server can be connected with the on-site protected host to obtain a plurality of packets of the on-site protected host by means of mirroring.

The extracting module 42 is configured for obtaining session data between the on-site protected host and a server on the basis of the traffic data, and extracting application layer data from the session data.

The session data may refer to TCP session data, and complete TCP session data include three handshakes at the beginning of the session and four waves at the end of the session.

Specifically, after the packets of the on-site protected host are obtained by means of mirroring, the packets may be parsed to obtain the complete TCP session data, and the complete TCP session data may be further parsed to obtain application layer data in each TCP session.

The simulation test module 44 is configured for transmitting and receiving the application layer data in a local test environment to carry out a simulation test.

The application layer data can include a source IP address, a source port, a destination IP address and a destination port, data content, etc.

Specifically, the simulation test module 44 is configured for establishing the local test environment based on the obtained application layer data, which can include obtaining a complete TCP session, parsing the complete TCP session to obtain a source IP address, a source port, a destination IP address and a destination port, and configuration of the sender and the receiver, and establishing the local test environment based on the obtained configuration. Furthermore, the step 203 can include locally simulating a client end and a server end, sending request data from the client end to the server end to carry out a simulation test, and sending returned data from the server end to the client end to carry out the simulation test.

It should be further noted that for the returned data, the traffic data is actually sent from a database server to the client end. At this moment, a port of the database server is served as the source port.

For the request data, the traffic data is actually sent from the client end to the database server. At this moment, a port of the client end is served as the source port.

The above modules can be provided to solve the problem of poor environment applicability of the network security testing, and achieve technical effect of rapid deployment of network environments.

It should be noted that the various modules mentioned above may be function modules or program modules, and may be implemented either by software or hardware. For modules implemented by hardware, the modules mentioned above may be located in the same processor; or the modules mentioned above may be separately located in different processors in any combination form.

The present disclosure may further provide an electronic device, including a processor and a memory that stores a computer program. The computer program is executed by the processor to implement the steps of the test method for simulating a customer series deployment environment in any one of the above embodiments. The present disclosure may further provide a test system for simulating a customer series deployment environment. The system includes a terminal device, a transmission device and a server device, and the terminal device can be connected to the server device via the transmission device. The terminal device is configured for obtaining traffic data of an on-site protected host. The server device is configured for obtaining session data between the on-site protected host and a server on the basis of the traffic data, extracting application layer data from the session data, establishing the local test environment based on the obtained application layer data, and transmitting and receiving the application layer data in a local test environment to carry out a simulation test.

Alternatively, the electronic device can further include a transmission device and an input/output device, the transmission device can be connected to the processor, and the input/output device can be connected to the processor.

Alternatively, in the present embodiment, the computer program can be executed by the processor to implement step 1 to step 3:

Step 1 includes obtaining traffic data of an on-site protected host;

Step 2 includes obtaining session data between the on-site protected host and a server on the basis of the traffic data, and extracting application layer data from the session data; and Step 3 includes transmitting and receiving the application layer data in a local test environment to carry out a simulation test.

It should be noted that specific examples in the present embodiment may refer to the examples described in the above embodiments and alternative embodiments, and the present embodiment will not be repeated herein.

In addition, in conjunction with the test method for simulating a customer series deployment environment in the above embodiments, the present disclosure may provide a storage medium to implement the method. The storage medium has stored a computer program, and the computer program is executed by a processor to implement any of the test methods for simulating a customer series deployment environment in the above embodiments.

Figure 5:
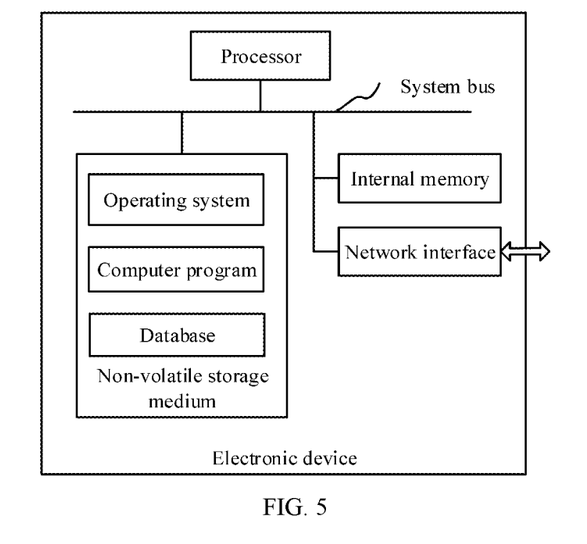
FIG. 5 is a block diagram of a computer readable storage medium in an embodiment of the present disclosure.

Those skilled in the art may understand that the structure shown in FIG. 5 is only a block diagram of a portion of the structure in the present disclosure, and does not constitute a limitation of the electronic device to which the present disclosure is applied, the specific electronic device may include more or fewer components than shown in the drawings, or combine some components, or have different component arrangements.

In an embodiment, the present disclosure may further provide a storage medium having stored a computer program. The computer program is executed by a processor to implement the steps of the test method for simulating a customer series deployment environment in the above embodiments.

Those of ordinary skill in the art may understand that all or part of the steps in the method of the above embodiments, may be implemented by hardware related to the computer program. The computer program may be stored in a non-volatile computer-readable storage medium, the computer program may include processes of the above embodiments when executed. Any reference to memory, storage, database or other media used in each embodiment provided in the present disclosure may include non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As a description rather than limitation, RAM is available in many forms, such as static RAM (SRAM), dynamic RAM (DRAM), synchronous DRAM (SDRAM), dual data rate SDRAM (DDRS-DRAM), enhanced SDRAM (ESDRAM), synchronous link DRAM (SLDRAM), Rambus RAM (RDRAM), Direct Rambus Dynamic RAM (DRDRAM), Rambus Dynamic RAM (RDRAM), etc.

It should be noted that the above modules may be a functional module or a program module, and may be implemented either by software or by hardware. For modules implemented by hardware, the above modules may be located in the same processor, or the above modules may be located in different processors in any combination.

The present disclosure may further provide an electronic apparatus, including a processor and a memory that stores a computer program running on the processor, and the computer program may be executed by the processor to implement the steps of the above network traffic anomaly detection method.

What is claimed is:

1. A test method for simulating a customer series deployment environment, comprising:

obtaining traffic data of an on-site protected host;

obtaining session data between the on-site protected host and a server on the basis of the traffic data, and extracting application layer data from the session data; and transmitting and receiving the application layer data in a local test environment to carry out a simulation test;

the obtaining session data between the on-site protected host and the server on the basis of the traffic data, and extracting application layer data from the session data further comprises:

filtering the traffic data to obtain session packets between the on-site protected host and the server;

determining at least one complete TCP session from the session packets; and extracting the application layer data from the TCP session;

the extracting the application layer data from the TCP session further comprises:

searching for a data sender IP, a data sender port, a data receiver IP, and a data receiver port of an application layer at a network layer, according to a communication protocol format between the on-site protected host and the server;

obtaining data content of the TCP session at the application layer according to the data sender IP, the data sender port, the data receiver IP, and the data receiver port which have been searched; and marking a distribution sequence of the data content of the TCP session at the application layer to obtain the application layer data;

the transmitting and receiving the application layer data in the local test environment to carry out the simulation test further comprises:

distributing the application layer data to a client end and a server end in the local test environment in sequence according to the distribution sequence;

distributing the application layer data to the server end for simulation when the data sender port in the local test environment coincides with the port of the protected host; and distributing the application layer data to the client end for simulation when the data receiver port in the local test environment coincides with the port of the protected host.

2. The test method of claim 1, wherein the obtaining traffic data of the on-site protected host further comprises:

configuring an IP address and a port of the protected host to obtain the traffic data of the protected host by means of mirroring.

3. The test method of claim 1, wherein the at least one complete TCP session comprises three handshakes at the beginning of the session and four waves at the end of the session.

4. The test method of claim 1, wherein the filtering the traffic data to obtain session packets between the on-site protected host and the server further comprises:

performing rule filtering on the traffic data by wireshark to obtain session packets between the on-site protected host and the server.

5. A test device for simulating a customer series deployment environment, comprising an obtaining module, an extracting module, and a simulation test module;

wherein the obtaining module is configured for obtaining traffic data of an on-site protected host;

the extracting module is configured for obtaining session data between the on-site protected host and a server on the basis of the traffic data, and extracting application layer data from the session data; and the simulation test module is configured for transmitting and receiving the application layer data in a local test environment to carry out a simulation test;

the extracting module is further configured for filtering the traffic data to obtain session packets between the on-site protected host and the server; determining at least one complete TCP session from the session packets; and extracting the application layer data from the TCP session;

the extracting module is further configured for searching for a data sender IP, a data sender port, a data receiver IP, and a data receiver port of an application layer at a network layer, according to a communication protocol format between the on-site protected host and the server; obtaining data content of the TCP session at the application layer according to the data sender IP, the data sender port, the data receiver IP, and the data receiver port which have been searched; and marking a distribution sequence of the data content of the TCP session at the application layer to obtain the application layer data;

the simulation test module is further configured for distributing the application layer data to a client end and a server end in the local test environment in sequence according to the distribution sequence; distributing the application layer data to the server end for simulation when the data sender port in the local test environment coincides with the port of the protected host; and distributing the application layer data to the client end for simulation when the data receiver port in the local test environment coincides with the port of the protected host.

6. An electronic device, comprising a processor and a memory that stores a computer program running on the processor, wherein the computer program is executed by the processor to implement the steps of the test method for simulating a customer series deployment environment of claim 1.

7. A non-volatile storage medium having stored a computer program, wherein the computer program is executed by a processor to implement the steps of the test method for simulating a customer series deployment environment of claim 1.

8. The electronic device of claim 6, wherein the obtaining traffic data of the on-site protected host further comprises:

configuring an IP address and a port of the protected host to obtain the traffic data of the protected host by means of mirroring.

9. The electronic device of claim 6, wherein the at least one complete TCP session comprises three handshakes at the beginning of the session and four waves at the end of the session.

10. The electronic device of claim 6, wherein the filtering the traffic data to obtain session packets between the on-site protected host and the server further comprises:

performing rule filtering on the traffic data by wireshark to obtain session packets between the on-site protected host and the server.

11. The non-volatile storage medium of claim 7, wherein the obtaining traffic data of the on-site protected host further comprises:

configuring an IP address and a port of the protected host to obtain the traffic data of the protected host by means of mirroring.

12. The non-volatile storage medium of claim 7, wherein the at least one complete TCP session comprises three handshakes at the beginning of the session and four waves at the end of the session.

13. The non-volatile storage medium of claim 7, wherein the filtering the traffic data to obtain session packets between the on-site protected host and the server further comprises:

performing rule filtering on the traffic data by wireshark to obtain session packets between the on-site protected host and the server.

* * * * *